United States Patent [19]

Mori

[11] Patent Number: 4,525,031
[45] Date of Patent: Jun. 25, 1985

[54] SOLAR LIGHT ENERGY AND ELECTRIC LIGHTING SYSTEM AND SOLAR AND ELECTRIC LIGHT LAMPS USED THEREIN

[76] Inventor: Kei Mori, 3-16-3-501, Kaminoge, Setagaya-ku, Tokyo, Japan

[21] Appl. No.: 240,999

[22] Filed: Mar. 5, 1981

Related U.S. Application Data

[63] Continuation of Ser. No. 43,832, May 30, 1979, abandoned.

[30] Foreign Application Priority Data

Jun. 7, 1978 [JP] Japan .................................. 53-67810
Jun. 13, 1978 [JP] Japan .................................. 53-71271

[51] Int. Cl.³ .......................................... G02B 17/00
[52] U.S. Cl. .................................. 350/265; 350/96.21; 362/32
[58] Field of Search ............................. 350/258–261, 350/265, 96.15, 96.21, 96.22; 362/32, 458

[56] References Cited

U.S. PATENT DOCUMENTS

| | | | |
|---|---|---|---|
| 3,113,728 | 12/1963 | Boyd | 350/261 X |
| 3,157,089 | 11/1964 | Menefee | 350/258 |
| 3,437,405 | 4/1969 | Northrop | 350/259 |
| 3,936,157 | 2/1976 | Kapany | 350/258 |
| 4,126,379 | 11/1978 | Wu | 350/260 |

Primary Examiner—Richard A. Wintercorn
Attorney, Agent, or Firm—Burgess, Ryan & Wayne

[57] ABSTRACT

A solar energy and electric lighting system wherein when the solar energy is available as in the day-time, it is utilized for lighting through conventional electric lamps, but when no solar energy is available or the solar energy available is not sufficient the electric lamps are turned on. Also disclosed are solar and electric light lamps which are capable of not only emitting solar energy but also light electrically produced, and which may be fabricated by minor modifications of conventional electric lamps.

7 Claims, 6 Drawing Figures

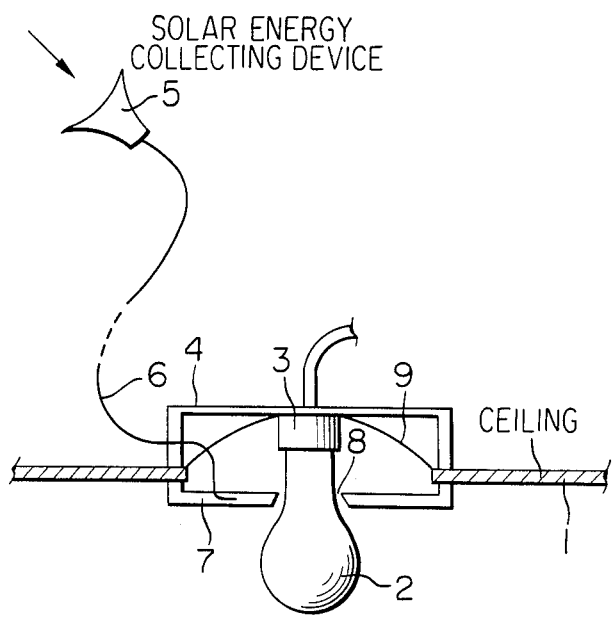
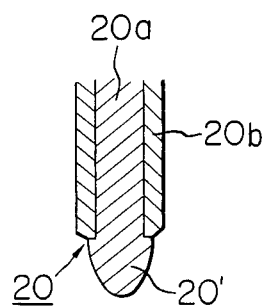
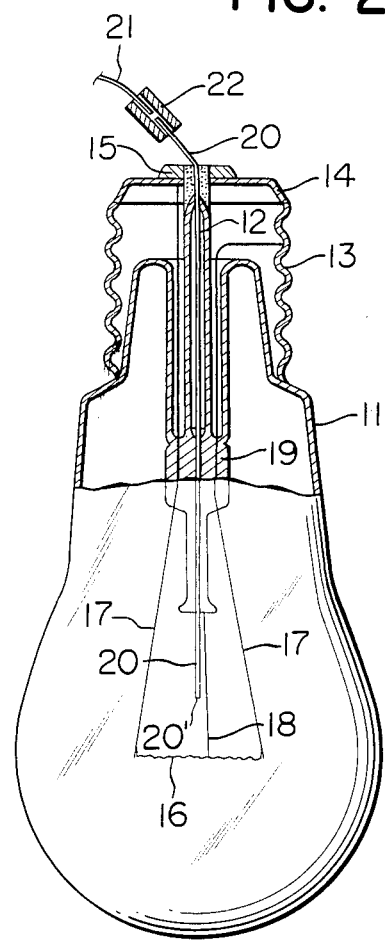
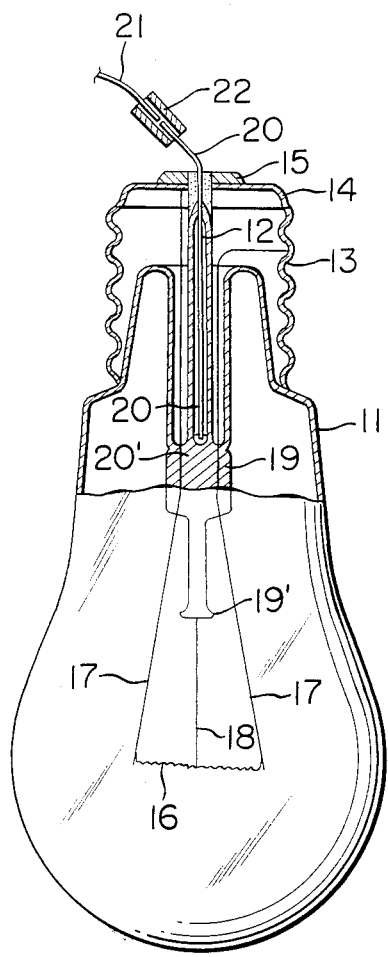

FIG. 5
FIG. 6
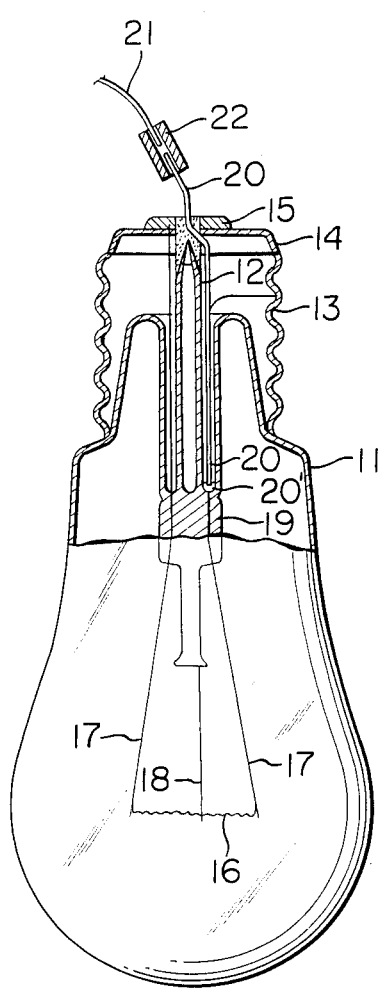
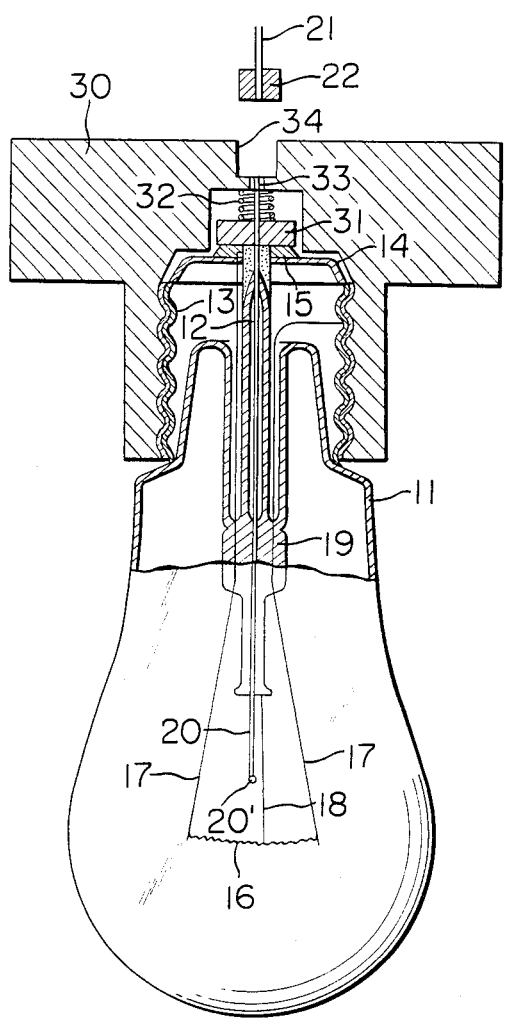

SOLAR LIGHT ENERGY AND ELECTRIC LIGHTING SYSTEM AND SOLAR AND ELECTRIC LIGHT LAMPS USED THEREIN

This is a continuation of application Ser. No. 43,832, filed May 30, 1979 now abandoned.

BACKGROUND OF THE INVENTION

The present invention relates to a solar energy and electric lighting system wherein when the solar energy is available as in the day-time, the conventional electric lamps are lighted by the solar light energy, but when no solar light energy is available or the solar light energy available is not sufficient the electric lamps are electrically turned on. The present invention further relates to solar and electric light lamps which are best adapted for use in the solar energy and electric lighting system described above and which not only may emit the solar energy or the Sun's light transmitted through light guide means but also may electrically produce the light when no solar energy is available.

The solar energy is the cleanest, most abundant and therefore most promising energy source for mankind, but the systems which may efficiently utilize the solar energy in practice have not been developed yet because of the low solar constant. That is, the large solar energy collection device such as a parabolic reflector is needed to increase the energy density, and the collected solar energy is converted into the electrical energy. Alternatively, the solar energy may be collected from a large number of solar cells distributed over a vast area, and the collected solar energy is also converted into electrical energy. However the efficiency of converting the solar energy into electrical energy is very low and the efficiency of the conversion of the electric energy into heat, light, mechanical and other energies is also low. Thus the overall solar energy utilization efficiency is extremely low.

SUMMARY OF THE INVENTION

Accordingly, one of the objects of the present invention is to provide a lighting system wherein the solar light may be utilized directly as a light source without converting it into other energy forms so that a high solar energy utilization efficiency may be attained.

Another object of the present invention is to provide a lighting system wherein the conventional light lamps which may be readily available in the market may be lighted directly by the solar light energy and may be electrically turned on when no solar light energy is available or the solar light energy available is not sufficient.

A further object of the present invention is to provide solar and electric light lamps adapted for use in the lighting systems described above.

A still further object of the present invention is to provide solar and electric light lamps which not only may emit the solar light when the latter is transmitted from a solar light collection device through light guide cables or the like but also may electrically produce the light when no solar light energy is available or the solar light energy available is not sufficient.

BRIEF DESCRIPTION OF THE DRAWINGS:

FIG. 1 is a diagrammatic view of one preferred embodiment of a solar light energy and electric lighting system in accordance with the present invention;

FIG. 2 is a side view, partly in section, of one example of a solar and electric light lamp adapted to be used in the solar light energy and electric lighting system of the present invention;

FIG. 3 is a fragmentary sectional view, on enlarged scale, of a filament-like light guide means used in the solar and electric light lamp shown in FIG. 2;

FIG. 4 is a side view, partly in section, of another example of a solar and electric light lamp in accordance with the present invention;

FIG. 5 is a side view, partly in section, of a still another example of a solar and electric light lamp in accordance with the present invention; and FIG. 6 is a side view, partly in section, of a solar and electric light lamp and its receptacle or a socket connector in accordance with the present invention.

Same reference numerals are used to designate similar parts throughout the figures.

DESCRIPTION OF THE PREFERRED EMBODIMENTS:

Solar and Electric Lighting System, FIG. 1

In FIG. 1 is shown an embodiment of a solar and electric lighting system in accordance with the present invention. Reference numeral 1 denotes a ceiling or a wall; 2, an incandescent X lamp; 3, a socket; and 4, a fixture for supporting the lamp 2. No explanation of the electric lighting mode will be needed.

According to the present invention, when the solar light energy is available, it is utilized for lighting the bulb 2 as will be described below. That is, the solar light energy is collected by a solar energy collecting device 5, and the collected solar light energy is transmitted through a light guide cable 6 to a light guide plate 7 with a center aperture 8 in which is located the bulb 2. The top, bottom and four side surfaces of the light guide plate 7 are coated, if necessary, with light reflecting films so that the light rays entering from the light guide cable 6 into the light guide plate 7 may emerge only from the annular peripheral surface of the center aperture 8 and enter the bulb 2 through its transparent portion. The bulb fixture 4 is provided with a parabolic reflecting mirror 9 so that the light rays which emerge from the peripheral surface of the center aperture 8 at such angles that they cannot enter the light bulb 2 may be redirected by the reflector 9 so as to enter into the bulb 2. Instead of the reflector 9, the inside surfaces of the bulb fixture 4 may be so designed as to serve as reflectors.

Therefore when the solar energy is available, the lamp 2 may be lighted by the solar light in the manner described above, but when no solar light energy is available or when the solar light energy available is not sufficient, the bulb may be electrically turned on to produce illumination light. The switching between the solar light illumination and the electric lighting may be switched manually or automatically, and both the solar light illumination and the electric lighting may be utilized simultaneously.

In FIG. 1 the combination of one electric bulb 2 and one light guide plate 7 is shown, but one light guide plate 7 may be used for lightening a plurality of bulbs. For instance, a ceiling may be constructed of a single light guide plate which is formed with a plurality of bulb insertion apertures 8 so that one light guide plate 7 may light a plurality of lamps 2.

In summary, according to the present invention when the solar light energy is available as in the day-time, it may be utilized as the light source so that the electric power consumption may be considerably reduced in the day-time. Furthermore the commercially available electric lamps may be used without any modifications so that the solar light energy illumination system of the present invention may be applied to the existing lighting systems at less cost. Furthermore according to the present invention the conversion of the solar light energy into electric energy is eliminated so that no conversion loss will result and consequently the solar energy may be utilized much more efficiently. Moreover, since the solar light illumination is made through the bulb or bulbs, no one will feel disagreeable when the electric lighting is switched to the solar light illumination or vice versa.

Solar and Electric Light Bulbs, FIGS. 2–6

In FIG. 1 is shown a solar and electric light lamp adapted to be used in the solar light energy and electric lighting system described above with reference to FIG. 1. Reference numeral 11 denotes a lamp enclosure or glass bulb; 12, an exhaust tube seal; 13, a base; 14, an insulator; 15, a base or center contact; 16, a filament; 17, lead-in wires; 18, a filament support; and 19, a steam with a button rod. These parts are those of the incandescent lamp well known in the art. According to the present invention, the lamp further includes a filament-like light guide means 20 with a light emitting end 20' which is extended through the stem 19 and its extension or buttom rod and beyond the button at the lower end of the button rod. The other end; that is, the end opposite to the light emitting end 20' of the filament-like guide means is connected through a connector 22 to a light guide cable 21 which in turn is connected to the solar energy collection device 5 (See FIG. 1). Therefore the solar light energy or the Sun's light is emitted from the light emitting end 20'.

In FIG. 3 is shown on enlarged scale and in fragmentary longitudinal sectional view the filament-like light guide means 20 which consists of an optical fiber consisting of a core 20a and a cladding 20b. Before the optical fiber 20 is inserted into the bulb or enclosure 11, the leading end portion of the optical fiber 20 is melted so that the core 20a may form into a tear drop and consequently the uniform light emission from the light emitting end 20' may be ensured.

In FIG. 4 is shown another example of the solar and electric light lamp which is substantially similar in construction to the lamp shown in FIG. 2 except that the filament-like light guide means 20 is physically and optically connected to the stem 19 so that the solar energy may be emitted from the button 19'.

In FIG. 5 is shown yet another example of the solar and electric light lamp which is substantially similar in construction to the lamp shown in FIG. 2 except that the filament-like light guide means 20 is extended outside of the bulb 11. Therefore the bulb or enclosure 11 and its interior parts may be fabricated in a conventional manner, and when the base 13 is attached to the bulb, the filament-like light guide means 20 may be attached to the stem 19. Thus the lamp shown in FIG. 5 is advantageous in that the fabrication may be considerably simplified.

In FIG. 6 is shown an example of a light bulb receptable or a socket connector adapted for receiving the solar and electric light lamp which is so modified that the other or upper end of the filament-like light guide means is terminated at the outer surface of the center contact 15 of the base 13. The socket connector consists of a main body 30 consisting of a small-diameter section and a large-diameter section. A female screw contact for engagement with the screw of the base 13 of the lamp is fitted into a large-diameter hole extended through the small-diameter section and partly into the large-diameter section. A small-diameter hole is partly extended through the large-diameter section from the bottom of the large-diameter hole, and a contact 31 made of metal and insulated from the base 13 is suspended by a coiled spring 32 from the bottom of the small-diameter hole for engagement with the center contact 15 of the base 13 of the lamp. The main body 30 is further provided with a connector receiving hole 34 which is extended in coaxial relationship with the small-diameter hole from the surface of the main body for receiving therein the connector 22 at the end of the light guide cable 21. A connecting light guide 33 is extended from the bottom of the connector receiving hole 34 to the bottom of the contact 31 through a connecting holes between the connector receiving hole 34 and the coiled spring 32.

When the lamp is screwed into the socket connector, the center contact 15 is made into engagement with the contact 31 of the socket connector which in turn is connected to one line while the screw contact of the socket connector which is in engagement with the screw of the base 13 of the lamp is connected to the other line, whereby the electric circuit of the lamp is established. The upper end of the filament-like light guide means 20 of the lamp is brought in line with the lower end of the connecting light guide means 33 and is optically coupled thereto while when the connector 22 at the end of the light guide cable 21 is inserted into the connector receiving hole 34, the end of the light guide cable 21 and the upper end of the connecting light guide means 33 are in line with each other and are optically coupled to each other so that the filament-like light guide means 20 in the lamp may be optically coupled to the solar energy collection device 5 (See FIG. 1).

It is preferable that the filament-like light guide means 20 in the lamp is larger in diameter than the interconnecting light guide means 33 so that the optical coupling between them may be facilitated and the optical transmission loss may be minimized.

It is to be understood that the present invention is not limited to the embodiments described above with reference to the accompanying drawings and that various modifications may be made. For instance, the present invention has been described in conjunction with the incandescent lamps, but it may be equally applied to other electric lamps such as fluorescent lamps, mercury vapor lamps and so on. The switching between the solar light energy illumination and the electric lighting may be made manually or automatically as described elsewhere. Furthermore the solar and electric light lamps of the present invention are advantageous in that when the solar light energy is available, it may be used for illumination, but when no solar light energy is available or the solar light energy available is not sufficient, the lamps may be electrically turned on. Thus the electric power consumption may be considerably reduced in the day-time. Moreover both the solar light energy illumination and the electric lightening may be made simultaneously with one light lamp if so required. Even when the electric light lighting is switched to the solar energy illumination or vice versa, no one will feel disagreeable. In addition, the light lamps may be easily replaced. Since the solar energy is directly used as the light source without any conversion into another energy form, it may be utilized much more efficiently.

What is claimed is:

1. A solar energy and electric lighting system, comprising:
   a solar light energy collection means;
   a solar light energy transmission means for transmitting the collected solar light energy; and
   a solar light energy guide means for guiding the transmitted solar light energy into an enclosure of an electric lamp through a transparent portion thereof,
   whereby said electric lamp may be also used for solar light energy illumination.

2. A solar light energy and electric lighting system as set forth in claim 1, wherein said solar light energy guide means includes a solar light energy guide plate structure having an aperture through which said electric light bulb may be screwed into a mating socket connector and light reflecting means disposed adjacent one or more of the top, bottom and side surfaces of said plate structure, whereby the solar light energy may emerge from the peripheral surface of said aperture into said electric lamp through the transparent portion thereof which is in opposed relationship with said peripheral surface of said aperture.

3. A solar and electric light lamp comprising an electric lamp socket for receiving an electric lamp having an enclosure, a light guide means extending through said socket into said enclosure by a predetermined length, said light guide means being optically exposed at the leading end thereof so that the light transmitted through said light guide means may be emitted from said optically exposed leading end.

4. A solar and electric light lamp as set forth in claim 3, wherein said lamp has a supporting stem and a button rod terminating in a button within said enclosure, and said light guide means extends through said supporting stem and said button rod beyond the button, at the end of said button rod remote from said stem, into said enclosure by a predetermined distance.

5. A solar and electric light lamp as set forth in claim 3, wherein said lamp has a base for engaging said socket, a stem secured to said base and having a transparent portion, and a button having a transparent end extending from said stem into said enclosure, said light guide means extending through the base of said electric lamp and being optically coupled to said stem so that the light emerging from the leading end of said light guide means may be propagated through said stem and said end of said button rod.

6. A solar and electric light lamp as set forth in claim 3, wherein said socket has electrical contacts for connection with mating contacts of said lamp, and an optical coupling means for engaging a portion of said light guide means disposed within the adjacent portion of said lamp in operative engagement with said socket, in optical coupling relationship when said lamp is coupled to said socket.

7. The lighting system according to claim 1, further comprising means within said lamp enclosure for emitting the light supplied thereto by said guide means and for scattering the emitted light over a predetermined angular region.

* * * * *